US012620568B2

(12) United States Patent
Pfeifer

(10) Patent No.: US 12,620,568 B2
(45) Date of Patent: May 5, 2026

(54) ANALYSING A FIELD OF A MASS SPECTROMETER

(71) Applicant: Thermo Fisher Scientific (Bremen) GmbH, Bremen (DE)

(72) Inventor: Markus Pfeifer, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 323 days.

(21) Appl. No.: 18/466,591

(22) Filed: Sep. 13, 2023

(65) Prior Publication Data

US 2024/0087871 A1 Mar. 14, 2024

(30) Foreign Application Priority Data

Sep. 14, 2022 (GB) ..................................... 2213500

(51) Int. Cl.
*H01J 49/26* (2006.01)

(52) U.S. Cl.
CPC .................................... *H01J 49/26* (2013.01)

(58) Field of Classification Search
CPC ...... H01J 49/26; H01J 49/288; H01J 49/0009; H01J 49/067; H01J 49/105; H01J 49/0027; G01N 27/62
USPC .................................................. 250/281, 282
See application file for complete search history.

(56) References Cited

FOREIGN PATENT DOCUMENTS

| | | | | |
|---|---|---|---|---|
| EP | 3769334 | B1 | 3/2022 | |
| WO | 0028574 | A1 | 5/2000 | |
| WO | WO-2019180045 | A1 * | 9/2019 | ............ H01J 49/288 |

OTHER PUBLICATIONS

Extended European Search Report from European Application No. 23197465.0, dated Feb. 1, 2024, 10 pages.
Craig et al., "Project Vienna: A Novel Precell Mass filter for Collision/Reaction Cell MC-ICPMS/MSm," Analytical Chemistry, 93(30): 10519-10527 (2021).
Combined Search and Examination Report under Sections 17 & 18(3) for related GB Application No. 2213500.8, issued by the UK Intellectual Property Office on Mar. 17, 2023, 5 pages.

* cited by examiner

*Primary Examiner* — Michael Maskell
(74) *Attorney, Agent, or Firm* — Klarquist Sparkman, LLP

(57) ABSTRACT

A method of analysing a field of a mass spectrometer comprising a mass analyser and a static field mass filter having a first Wien filter and a second Wien filter is provided. The method includes, for each of a plurality of predetermined strengths of one of an electric field or a magnetic field of the first and second Wien filters: setting the one of the electric field or the magnetic field of the first and second Wien filters to the predetermined strength; causing a beam of ions comprising one or more ion species to be injected through the static field mass filter; and measuring, using the mass analyser, a respective intensity of ions of each of the one or more ion species in the beam.

21 Claims, 9 Drawing Sheets

ANALYSING A FIELD OF A MASS SPECTROMETER

CROSS REFERENCE TO RELATED APPLICATION

This application claims priority to United Kingdom Patent Application No. GB2213500.8, filed Sep. 14, 2022, which is incorporated herein by reference in its entirety.

FIELD

The present disclosure relates generally to mass spectrometers with a static field mass filter.

BACKGROUND

Multicollector mass spectrometers, such as inductively coupled plasma mass spectrometers (MC-ICP-MS), are instruments used to investigate small differences in the abundance ratios of analysed isotopes.

For example, Strontium (Sr) has 4 isotopes with the following masses and abundances:

| Isotope | 84Sr | 86Sr | 87Sr | 88Sr |
|---|---|---|---|---|
| Abundance | 0.56% | 9.86% | 7% | 82.58% |

With improvements in the accuracy of mass spectrometers during the last century, it became clear that the isotope ratios (87Sr/86Sr≈0.7103 or 84Sr/87Sr≈0.0535) are not identical across different samples. Furthermore, it became apparent that the accurate determination of Sr isotope ratios is a powerful tool for archaeologists. Since the isotopic composition of the diet of an individual is preserved in the bones of an individual, a statement about the place of birth of an individual can be made when matching the Sr isotope ratios of the bones of a dead body to the Sr isotope ratios of the soil in a specific region.

Besides Sr, there are many other isotope systems which are of interest for scientific or technical questions. Another example is the Rubidium-Strontium (Rb—Sr) dating which makes use of the fact that 87Rb decays into 87Sr with a half-life of about 50 billion years: by determining the 87Sr/86Sr ratio as well as the Rb/Sr ratio of different minerals of a sample, the time elapsed since the sample crystallised can be calculated.

However, the 87Sr cannot be easily mass resolved from the 87Rb (86.909180527 amu to 86.9088774970 amu would require a mass resolving power of more than 200,000, while the upper limit of commercially available isotope ratio mass spectrometers is below 50,000). Isotopic methods that suffer from isotopic interferences as the Rb/Sr method therefore require complex chemical cleaning steps prior to the actual measurement with a mass spectrometer, which makes these methods time consuming and limits them to samples that are available in relatively high quantities.

A solution for this problem is the use of a collision reaction cell: the ions are guided through a cell which is filled with a reactive gas. With an appropriate choice of the gas, one can obtain that the analyte ions are mass-shifted (by forming molecules when reacting with the gas), while the interfering ions are not. For example, the analyte ions become 16 atomic mass units (amu) heavier when reacting with oxygen, while the mass of the interfering ions remains the same.

By doing this, the mass difference of sample ions and interfering ions, which was marginal before entering the collision cell, becomes large enough to be easily resolved by the mass spectrometer downstream of the collision cell.

To avoid the problem of elements that interfere with the mass shifted analyte ions, a pre-mass-filter with a bandpass characteristic can be used, such that only the masses of interest reach the collision cell while ions that interfere with the mass shifted ions are not transmitted. In EP 3 769 334 B1, the entire contents of which are herewith incorporated by reference in this document, a pre-filter comprising a combination of two Wien filters is disclosed. Such a pre-filter can have a mass-independent transmission.

A pre-filter comprising a combination of two Wien filters is suitable for blocking the intense Ar beam caused by the plasma source of ICP-MS instruments as early as possible in the ion optics. By blocking the Ar beam, the total ion load of the ion beam is greatly reduced. This is beneficial for the resolving power of the instrument and, in particular, for the abundance sensitivity. However, optimizing the settings of a pre-filter comprising a double Wien filter is not intuitive.

SUMMARY

Aspects of the present disclosure are defined in the accompanying independent claims.

Overview of Disclosure

A method of analysing a field of a mass spectrometer comprising a mass analyser and a static field mass filter having a first Wien filter and a second Wien filter is disclosed herein. The method comprises:

for each of a plurality of predetermined strengths of one of an electric field or a magnetic field of the first and second Wien filters:

setting the one of the electric field or the magnetic field of the first and second Wien filters to the predetermined strength;

causing a beam of ions comprising one or more ion species to be injected through the static field mass filter; and measuring, using the mass analyser, a respective intensity of ions of each of the one or more ion species in the beam.

Optionally, the one or more ion species comprise a plurality of ion species, and the method further comprises:

determining a ratio of the intensity of ions of a first one of the plurality of ion species and the intensity of ions of a second one of the plurality of ion species.

Optionally, the method further comprises:

displaying, for each of the plurality of predetermined strengths, the determined ratio.

Optionally, the method further comprises:

displaying, for each of the plurality of predetermined strengths, at least one of the respective measured intensities.

Optionally, the method further comprises:

determining at least one strength range of the plurality of predetermined strengths in which the respective measured intensities of ions satisfy one or more predetermined mathematical/statistical criteria; and setting the one of the electric field or the magnetic field of the first and the second Wien filters to a strength within the at least one strength range.

Optionally, the method further comprises:

determining at least one strength range of the plurality of predetermined strengths in which the respective measured intensities of ions of a first one of the one or more ion species are within a given intensity range; and setting the one of the electric field or the magnetic field of the first and the second Wien filters to a strength within the at least one strength range.

Optionally, at least one of:

the given intensity range includes a number of the respective measured intensities which match a predetermined pattern; and the given intensity range includes a maximum of the respective measured intensities of ions of the first one of the one or more ion species. "Matching" may be defined as having a discrepancy smaller than a certain threshold.

Optionally, the method further comprises:

determining at least one strength range of the plurality of predetermined strengths in which the determined ratio is within a given ratio range; and setting the one of the electric field or the magnetic field of the first and the second Wien filters to a strength within the at least one strength range.

Optionally, the given ratio range is a range within which the determined ratio is determined not to vary more than a predetermined amount.

Optionally, the method further comprises:

setting the other of the electric field or the magnetic field of the first and second Wien filters to a predetermined constant strength during the causing and measuring for each of the plurality of predetermined strengths.

Optionally, the plurality of predetermined strengths comprises:

a minimum strength;

a maximum strength; and further optionally, one or more strengths between the minimum and maximum strengths.

Optionally, the minimum strength, the maximum strength and the one or more strengths between the minimum and maximum strengths are equally spaced.

Optionally, the method is computer-implemented.

There is disclosed an apparatus configured to perform any of the methods described herein.

There is disclosed a computer-readable medium comprising instructions which, when executed by a processor of an apparatus, cause the apparatus to perform any of the methods described herein.

BRIEF DESCRIPTION OF THE DRAWINGS

Examples of the present disclosure will now be explained with reference to the accompanying drawings in which.

Throughout the description and the drawings, like reference numerals refer to like parts. Implementations are illustrated by way of example, not by way of limitation, in the figures of the accompanying drawings.

DETAILED DESCRIPTION

Figure 1:
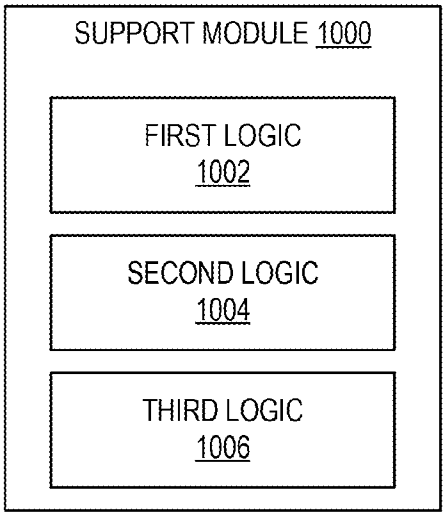
FIG. 1 is a block diagram of an example scientific instrument support module for performing support operations, in accordance with various implementations.

In overview, a method of analysing a field of a mass spectrometer comprising a mass analyser and a static field mass filter having a first Wien filter and a second Wien filter is disclosed herein.

The method comprises setting a magnetic or electric field of the static field mass filter, injecting a beam of ions into the filter, and measuring the intensity of ions of at least one ion species in the beam. Optionally, a ratio of the intensity of two different ion species in the beam may be determined.

The present approach is for use in a mass spectrometer including a static field mass filter such as that described in EP 3 769 334 B1 (e.g., Thermo Fisher Scientific's "Neoma™ MS/MS MC-ICP-MS"). Static field mass filters may apply a constant electric field and apply a magnetic field. This leads to a flat transmission of ions across a selected mass-to-charge ratio (m/z) range, and small deviations in system tuning should not change the measured isotope ratio in an unpredictable way. The static field mass filter is able to select a mass window prior to entry of the ions into a reaction cell. Although masses are separated by static magnetic and electric fields, the complete arrangement of the ion optical pre-filter setup does not introduce a lateral mass discrimination for the selected m/z window at the relatively small input aperture of a reaction cell.

Preferably, the static field mass filter comprises a first and a second Wien filters with an inversion lens between them. This arrangement uses static and not time-dependent (RF-based) ion optics to separate the ions and, as a result of the symmetry between the first and second Wien filters and the use of an inversion lens, mass-to-charge separation introduced within the static field mass filter is nullified at the exit thereof. The resulting instrument may be tuned along the path of the ions, because there is a relatively simple relationship between the electric and magnetic fields, and the mass-to-charge ratio of the ions.

The design of a double Wien-filter preceding the standard Neoma mass spectrometer in the Neoma™ MS/MS MC-ICP-MS provides a pre-filter which allows unwanted ions, such as Argon (Ar), to be cut from the mass spectrum or to clean a mass range for reacting analytes into this mass area for online chemical separation via a collision cell. Tuning this part of the instrument is important for good performance.

In the case of Neoma™ MS/MS a combination of two Wien filters has been chosen for pre-filtering the ions. This is because, to avoid the problem of elements that interfere with the mass shifted analyte ions, a pre-mass-filter with a bandpass characteristic should be used such that only the masses of interest reach the collision cell while ions that interfere with the mass shifted ions are not transmitted. The benefit of using two Wien filters is that it does not require alternating potentials (as in a quadrupole filter) which usually lead to a mass dependent transmission.

Another important function of the pre-filter is to block the intense Ar beam that is apparent in mass spectrometers with a plasma source as early as possible in the ion optics. By blocking the Ar beam the total ion load of the ion beam is greatly reduced, which is beneficial for the resolving power of the instrument and most of all beneficial for the abundance sensitivity.

Optimising the electric and magnetic parameters of the Wien filter is important for the function of the mass spectrometer. Since the double Wien mass filter disperses the ion beam according to the ion masses, it filters out the unwanted ions and cancels out the dispersion of the transmitted ions. The lens parameters should be adjusted carefully in order to transmit all ions with the same transmission efficiency.

To simplify the user workflow, a new kind of electric field scan to find the optimal tuning conditions of the pre-filter may be used.

This design having a double Wien-filter preceding the standard Neoma mass spectrometer in the Neoma™ MS/MS MC-ICP-MS requires to set an electrical field (E-field) at a constant magnetic field (or vice versa) to allow ideal transmission of masses of interest through the pre-filter part. However, the transmission window can adopt complex patterns, especially in presence of large ion beams, such as Argon, inherent to ICP-MS. The new pre-filter scan developed for this design may give the user the ability to more easily find the optimal electric field setting (or optimal magnetic field setting) for the intended application.

The previous way of setting this value was manually scanning the E-field to find the peak of highest ion beam intensity. This may yield inaccurate and poorly reproducible results.

An advantage of the present approach is that it enables more reproducible tuning, which may yield better measurement results and may increase ease of use of the mass spectrometer for the user.

It is noted that the present disclosure is not limited to mass spectrometers having an ICP ion source but can also be applied to mass spectrometers having an electron ionization ion source, a chemical ionization ion source, an electrospray ion source, a matrix-assisted laser desorption/ionization (MALDI) ion source, a photoionization ion source, a glow discharge ionization sources, a thermal ionization source and/or any other suitable ionization source.

The approaches described herein may be implemented using the apparatus or system(s) described below.

FIG. 1 is a block diagram of a scientific instrument support module 1000 for performing support operations, in accordance with various implementations. The scientific instrument support module 1000 may be implemented by circuitry (e.g., including electrical and/or optical components), such as a programmed computing device. The logic of the scientific instrument support module 1000 may be included in a single computing device, or may be distributed across multiple computing devices that are in communication with each other as appropriate. Examples of computing devices that may, singly or in combination, implement the scientific instrument support module 1000 are discussed herein with reference to the computing device 4000 of FIG. 4. Examples of systems of interconnected computing devices, in which the scientific instrument support module 1000 may be implemented across one or more of the computing devices, are discussed herein with reference to the scientific instrument support system 5000 of FIG. 5.

The scientific instrument support module 1000 may include first logic 1002, second logic 1004, and third logic 1006. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular implementation, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

As mentioned above, the scientific instrument support module 1000 may be implemented in a system of interconnected computing devices. In such a system, the scientific instrument support module 1000 may interact with a scientific instrument 5010 (the interaction with which is discussed herein with reference to FIG. 5) which may include any appropriate scientific instrument, such as a mass spectrometer 200 having a static field mass filter 204.

Figure 2A:
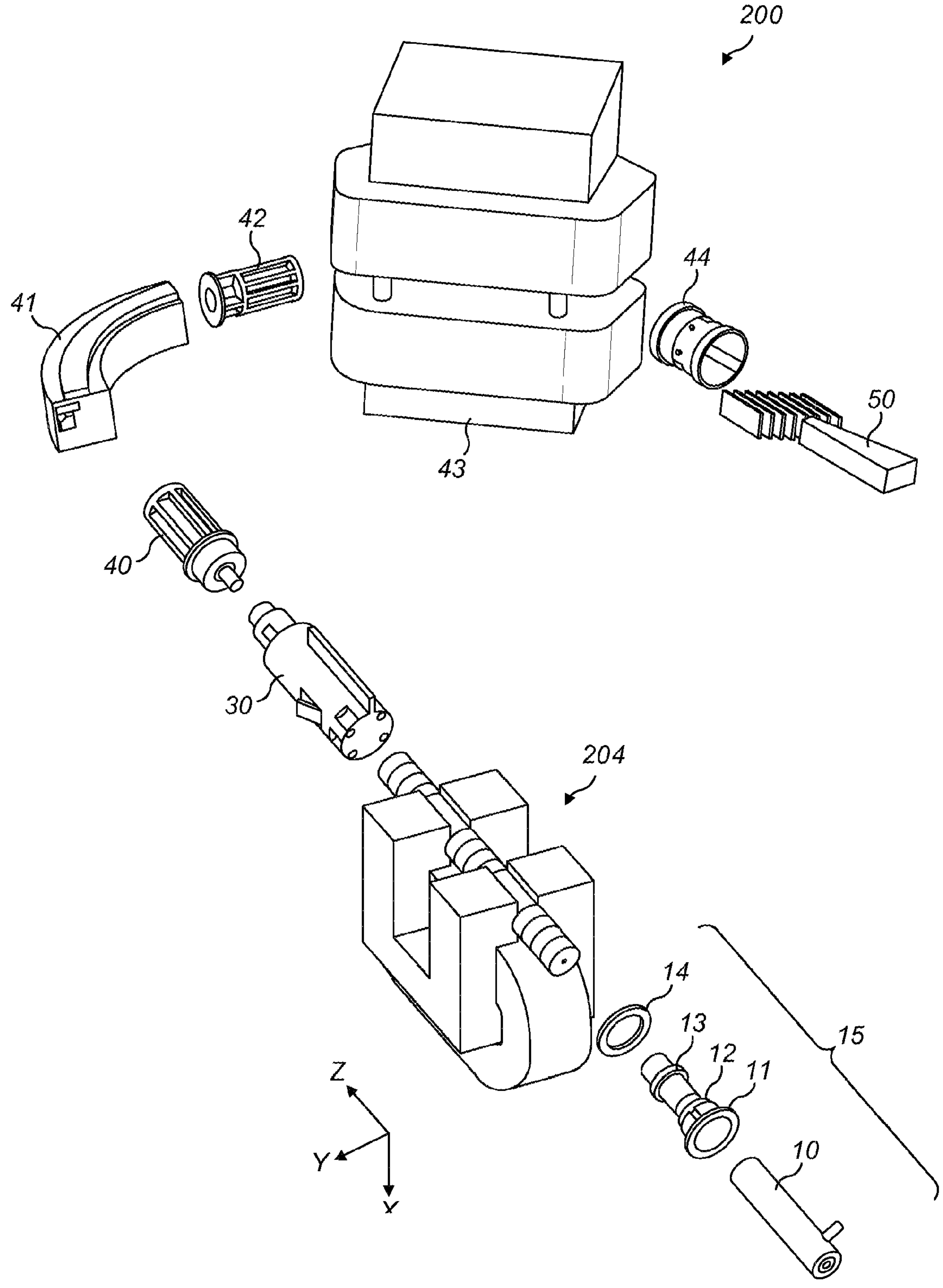
FIG. 2A is a simplified view of an example instrument system in accordance with various implementations.

FIG. 2A shows a view of an example mass spectrometer 200 having a static field mass filter 204.

The mass spectrometer 200 includes an ion source 15. The ion source 15 includes a triaxial ICP torch 10, a sampler cone 11, one or more skimmer cones 12, an extraction lens 13 and/or a further skimmer cone 14 and/or another ion optical device 14. This results in a collimated ion beam.

Downstream of the ion source 15, instead of a quadrupole (RF) mass filter, is positioned a static field mass filter 204 which will be described in further detail below. The static field mass filter 204 maintains constant electric and magnetic fields, so that transmission of ions through the static field mass filter has a flat response across the selected m/z range. A quadrupole mass filter does not provide such a flat response. This is because the ions are only influenced by static fields. In a quadrupole mass filter, the electromagnetic fields change with time according to the applied frequency. This results in a zig zag trajectory of the ions which are pushed back and forth. Moreover, small deviations in system tuning of the static field mass filter 204 do not change the measured isotope ratio in an unpredictable way. Nevertheless, the static field mass filter 204 does not introduce a lateral mass discrimination (as would happen in, for example, a magnetic sector analyser) so that the ion beam exiting the static field mass filter 204 can be focused onto the relatively small (c. 2 mm) entrance aperture of a collision cell 219, across the width of the mass window selected for transmission by the static field mass filter 204.

Following the collision cell 219, ions are accelerated by an accelerator 40 and focused into the ion optics of a double focusing high resolution multicollector mass spectrometer for simultaneous detection of different isotopes (of the sample or standards). Further, the double focusing high resolution multicollector mass spectrometer again includes an electrostatic sector 41 and a magnetostatic sector 43, separated by a focusing lens 42. Downstream of the high resolution multicollector mass spectrometer, the arrangement contains dispersion optics 44 and finally a detector platform 50 again, for example, such as that described in GB-A-2,541,391.

The preferred arrangement of a static field mass filter 204 in the arrangement of FIG. 2A is a double Wien filter. Wien filters employ an arrangement of crossed electrostatic and magnetostatic fields. Ions passing through this arrangement are subject to the magnetic Lorentz force and the electric field strength.

Figure 2B:
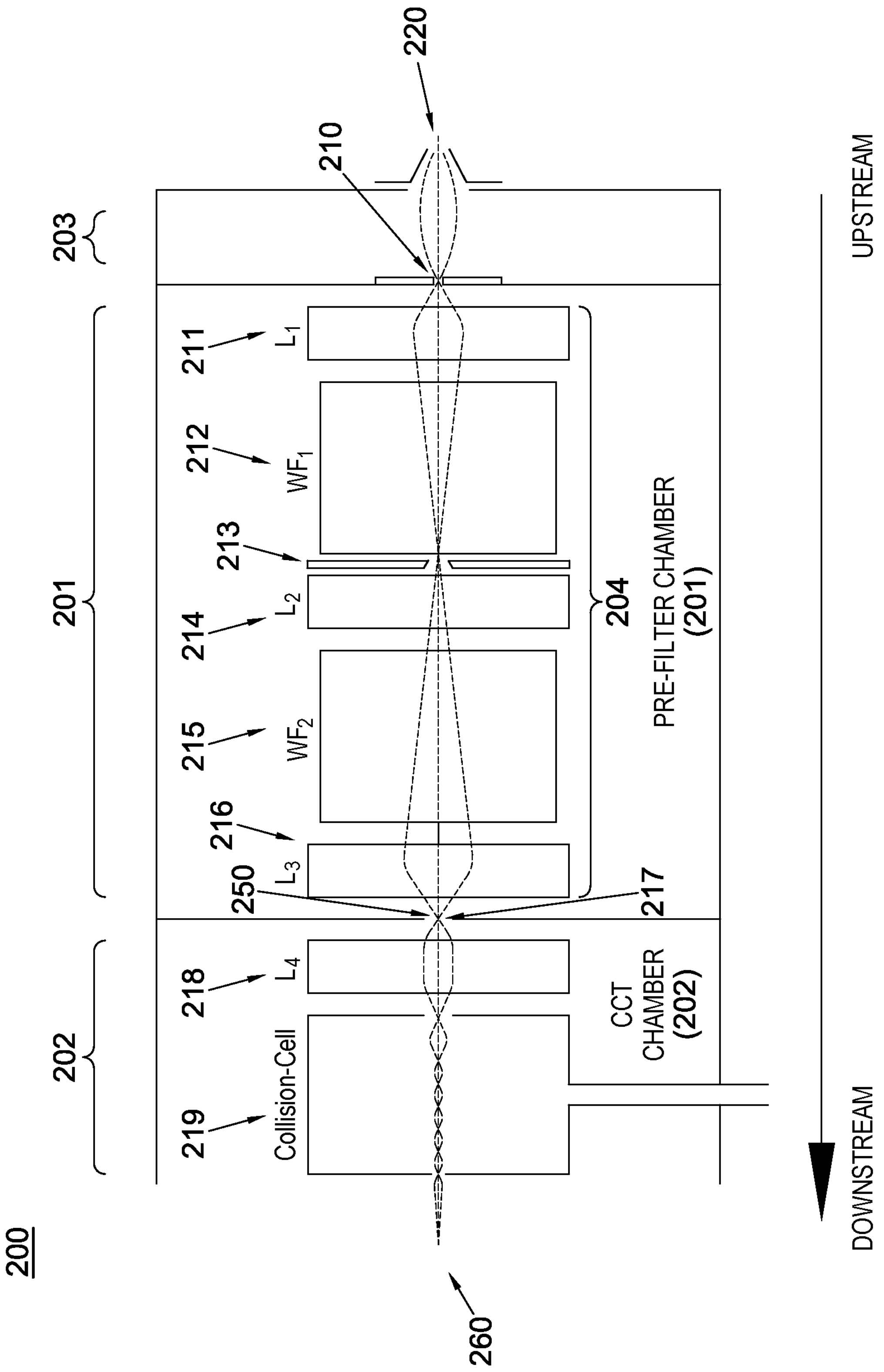
FIG. 2B is a simplified diagram of an example static field mass filter of the instrument system in accordance with various implementations.

FIG. 2B is simplified diagram of a pre-filter chamber 201 of a mass spectrometer 200 having a static field mass filter 204 in which some or all of the methods disclosed herein may be performed, in accordance with various implementations.

The mass spectrometer also has a collision cell chamber 202 and an extraction area 203, respectively downstream and upstream of the pre-filter chamber 201.

The mass spectrometer 200 may also include a mass analyser (not shown) downstream of the collision cell chamber 202 shown in FIG. 2B.

The pre-filter chamber 201 of the mass spectrometer 200 may comprise an entrance aperture 210, a static field mass filter 204, and an exit aperture 217. The static field mass filter 204 may comprise a first lens (or 'lens one') 211, a first Wien filter 212, a slit 213 (which can be narrowed to a minimum slit width and widened to a width larger than the minimum slit width), a second lens (or 'lens two') 214, a second Wien filter 215, and a third lens (or 'lens three') 216.

The collision cell chamber 202 may comprise a fourth lens (or 'lens four') 218 and a collision cell 219.

The extraction area 203 may comprise an extraction lens (not shown) for injecting a beam of ions 220 comprising one or more ion species into the pre-filter chamber 201 through entrance aperture 210.

The beam 220 may pass through the pre-filter chamber 201 and exit from exit aperture 217 to yield beam 250. The beam 250 exiting the pre-filter chamber 201 may enter the collision cell chamber 202. In the collision cell chamber 202, exiting beam 250 may pass through fourth lens 218 and collision cell 219 to yield beam 260.

Figure 4:
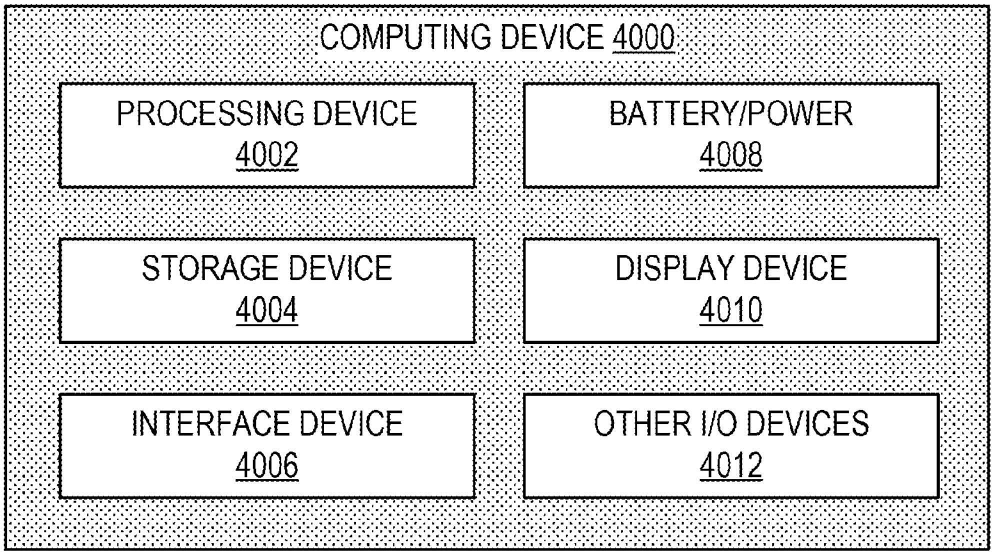
FIG. 4 is a block diagram of an example computing device that may perform some or all of the methods disclosed herein, in accordance with various implementations.
Figure 5:
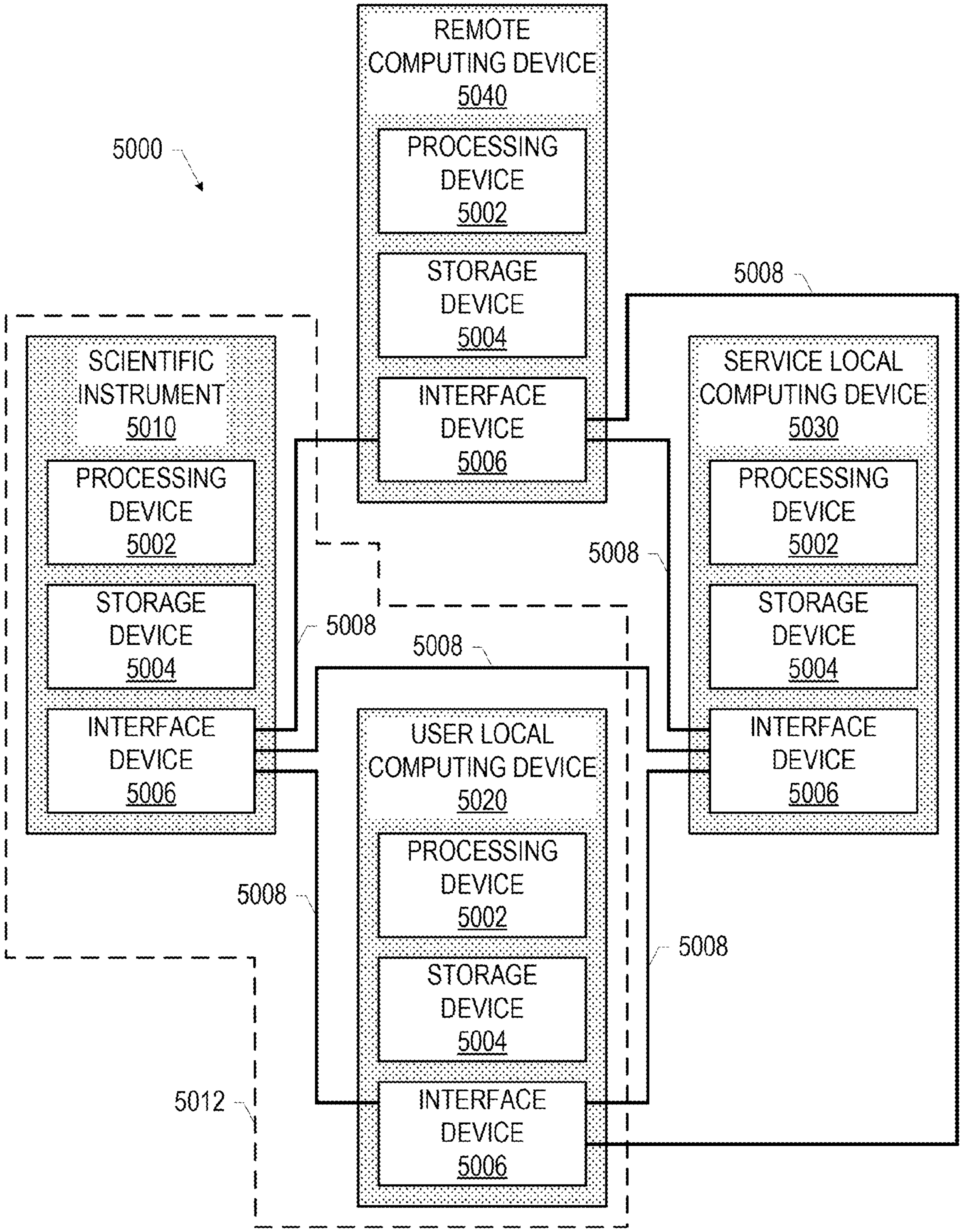
FIG. 5 is a block diagram of an example scientific instrument support system in which some or all of the methods disclosed herein may be performed, in accordance with various implementations.

The methods disclosed herein may include interactions with a human user (e.g., via the user local computing device 5020 discussed herein with reference to FIG. 5). These interactions may include providing information to the user (e.g., information regarding the operation of a scientific instrument such as the scientific instrument 5010 of FIG. 5, information regarding a sample being analysed or other test or measurement performed by a scientific instrument, information retrieved from a local or remote database, or other information) or providing an option for a user to input commands (e.g., to control the operation of a scientific instrument such as the scientific instrument 5010 of FIG. 5, or to control the analysis of data generated by a scientific instrument), queries (e.g., to a local or remote database), or other information. In some implementations, these interactions may be performed through a graphical user interface (GUI) that includes a visual display on a display device (e.g., the display device 4010 discussed herein with reference to FIG. 4) that provides outputs to the user and/or prompts the user to provide inputs (e.g., via one or more input devices, such as a keyboard, mouse, trackpad, or touchscreen, included in the other I/O devices 4012 discussed herein with reference to FIG. 4). The scientific instrument support systems disclosed herein may include any suitable GUIs for interaction with a user.

Figure 3:
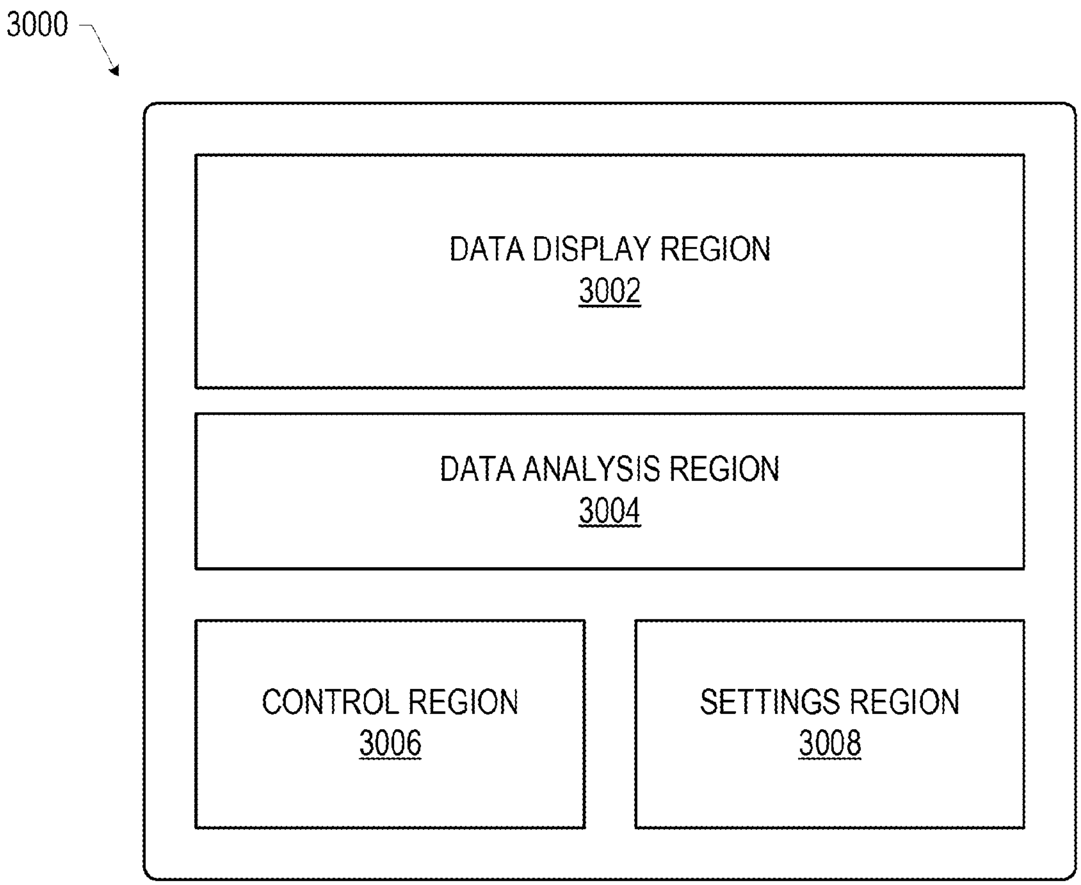
FIG. 3 is an example of a graphical user interface that may be used in the performance of some or all of the methods disclosed herein, in accordance with various implementations.

FIG. 3 depicts an example GUI 3000 that may be used in the performance of some or all of the methods disclosed herein, in accordance with various implementations. As noted above, the GUI 3000 may be provided on a display device (e.g., the display device 4010 discussed herein with reference to FIG. 4) of a computing device (e.g., the computing device 4000 discussed herein with reference to FIG. 4) of a scientific instrument support system (e.g., the scientific instrument support system 5000 discussed herein with reference to FIG. 5), and a user may interact with the GUI 3000 using any suitable input device (e.g., any of the input devices included in the other I/O devices 4012 discussed herein with reference to FIG. 4) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 3 is simply illustrative, and any number and arrangement of regions, including any desired features, may be included in a GUI 3000.

The data display region 3002 may display data generated by a scientific instrument (e.g., the scientific instrument 5010 discussed herein with reference to FIG. 5). For example, the data display region 3002 may display any intensities described herein.

The data analysis region 3004 may display the results of data analysis (e.g., the results of analysing the data illustrated in the data display region 3002 and/or other data). For example, the data analysis region 3004 may display any of the ratios described herein, or at least one strength range of a plurality of predetermined strengths in which respective measured intensities of ions of a first one of one or more ion species are within a given intensity range, as determined in the approaches described herein. In some implementations, the data display region 3002 and the data analysis region 3004 may be combined in the GUI 3000 (e.g., to include data output from a scientific instrument, and some analysis of the data, in a common graph or region).

The scientific instrument control region 3006 may include options that allow the user to control a scientific instrument (e.g., the scientific instrument 5010 discussed herein with reference to FIG. 5). For example, the scientific instrument control region 3006 may include controls to cause a beam of ions to be injected into the static field mass filter 204 or to set the electric field and/or the magnetic field applied in the first Wien filter 212 or the second Wien filter 215.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 4, sending data to another user, labelling data, etc.). For example, the settings region 3008 may include settings to switch between automated and manual analysis modes of the mass spectrometer 200.

As noted above, the scientific instrument support module 1000 may be implemented by one or more computing devices. FIG. 4 is a block diagram of a computing device 4000 that may perform some or all of the methods disclosed herein, in accordance with various implementations. In some implementations, the scientific instrument support module 1000 may be implemented by a single computing device 4000 or by multiple computing devices 4000. Further, as discussed below, a computing device 4000 (or multiple computing devices 4000) that implements the scientific instrument support module 1000 may be part of one or more of the scientific instrument 5010, the user local computing device 5020, the service local computing device 5030, or the remote computing device 5040 of FIG. 5.

The computing device 4000 of FIG. 4 is illustrated as having a number of components, but any one or more of these components may be omitted or duplicated, as suitable for the application and setting. In some implementations, some or all of the components included in the computing device 4000 may be attached to one or more motherboards and enclosed in a housing (e.g., including plastic, metal, and/or other materials). In some implementations, some these components may be fabricated onto a single system-on-a-chip (SoC) (e.g., an SoC may include one or more processing devices 4002 and one or more storage devices 4004). Additionally, in various implementations, the computing device 4000 may not include one or more of the components illustrated in FIG. 4, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some implementations, the storage device 4004 may include memory that shares a die with a processing device 4002. In such an implementation, the memory may be used as cache memory and may include embedded dynamic random access memory (eDRAM) or spin transfer torque magnetic random access memory (STT-MRAM), for example. In some implementations, the storage device 4004 may include computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some implementations they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). In some implementations, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some implementations, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some implementations, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some implementations, the interface device 4006 may include one or more antennas (e.g., one or more antenna arrays) for receipt and/or transmission of wireless communications.

In some implementations, the interface device 4006 may include circuitry for managing wired communications, such as electrical, optical, or any other suitable communication protocols. For example, the interface device 4006 may include circuitry to support communications in accordance with Ethernet technologies. In some implementations, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some implementations, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode (LED) display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultramobile personal computer, etc.), a desktop computing device, or a server computing device or other networked computing component.

One or more computing devices implementing any of the scientific instrument support modules or methods disclosed herein may be part of a scientific instrument support system. FIG. 5 is a block diagram of an example scientific instrument support system 5000 in which some or all of the methods disclosed herein may be performed, in accordance with various implementations. The scientific instrument support modules and methods disclosed herein (e.g., the scientific instrument support module 1000 of FIG. 1 and the method 600 of FIG. 6) may be implemented by one or more of the scientific instrument 5010, the user local computing device 5020, the service local computing device 5030, or the remote computing device 5040 of the scientific instrument support system 5000.

Any of the scientific instrument 5010, the user local computing device 5020, the service local computing device 5030, or the remote computing device 5040 may include any of the implementations of the computing device 4000 discussed herein with reference to FIG. 4, and any of the scientific instrument 5010, the user local computing device 5020, the service local computing device 5030, or the remote computing device 5040 may take the form of any appropriate ones of the implementations of the computing device 4000 discussed herein with reference to FIG. 4.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 4, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the scientific instrument support system 5000 via communication pathways 5008. The communication pathways 5008 may communicatively couple the interface devices 5006 of different ones of the elements of the scientific instrument support system 5000, as shown, and may be wired or wireless communication pathways (e.g., in accordance with any of the communication techniques discussed herein with reference to the interface devices 4006 of the computing device 4000 of FIG. 4). The particular scientific instrument support system 5000 depicted in FIG. 5 includes communication pathways between each pair of the scientific instrument 5010, the user local computing device 5020, the service local computing device 5030, and the remote computing device 5040, but this "fully connected" implementation is simply illustrative, and in various implementations, various ones of the communication pathways 5008 may be absent. For example, in some implementations, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument, such as mass spectrometer 200 having a static field mass filter 204 and a mass analyser.

The user local computing device 5020 may be a computing device (e.g., in accordance with any of the implementations of the computing device 4000 discussed herein) that is local to a user of the scientific instrument 5010. In some implementations, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some implementations, the user local computing device 5020 may be a laptop, smartphone, or tablet device. In some implementations the user local computing device 5020 may be a portable computing device.

The service local computing device 5030 may be a computing device (e.g., in accordance with any of the implementations of the computing device 4000 discussed herein) that is local to an entity that services the scientific instrument 5010. For example, the service local computing device 5030 may be local to a manufacturer of the scientific instrument 5010 or to a third-party service company. In some implementations, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some implementations, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the implementations of the computing device 4000 discussed herein) that is remote from the scientific instrument 5010 and/or from the user local computing device 5020. In some implementations, the remote computing device 5040 may be included in a datacentre or other large-scale server environment. In some implementations, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some implementations, one or more of the elements of the scientific instrument support system 5000 illustrated in FIG. 5 may not be present. Further, in some implementations, multiple ones of various ones of the elements of the scientific instrument support system 5000 of FIG. 5 may be present. For example, a scientific instrument support system 5000 may include multiple user local computing devices 5020 (e.g., different user local computing devices 5020 associated with different users or in different locations). In another example, a scientific instrument support system 5000 may include multiple scientific instruments 5010, all in communication with service local computing device 5030 and/or a remote computing device 5040; in such an implementation, the service local computing device 5030 may monitor these multiple scientific instruments 5010, and the service local computing device 5030 may cause updates or other information to be "broadcast" to multiple scientific instruments 5010 at the same time. Different ones of the scientific instruments 5010 in a scientific instrument support system 5000 may be located close to one another (e.g., in the same room) or farther from one another (e.g., on different floors of a building, in different buildings, in different cities, etc.). In some implementations, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some implementations, a scientific instrument 5010 may be sold by the manufacturer along with one or more associated user local computing devices 5020 as part of a local scientific instrument computing unit 5012.

In some implementations, different ones of the scientific instruments 5010 included in a scientific instrument support system 5000 may be different types of scientific instruments 5010. In some such implementations, the remote computing device 5040 and/or the user local computing device 5020 may combine data from different types of scientific instruments 5010 included in a scientific instrument support system 5000.

Figure 6:
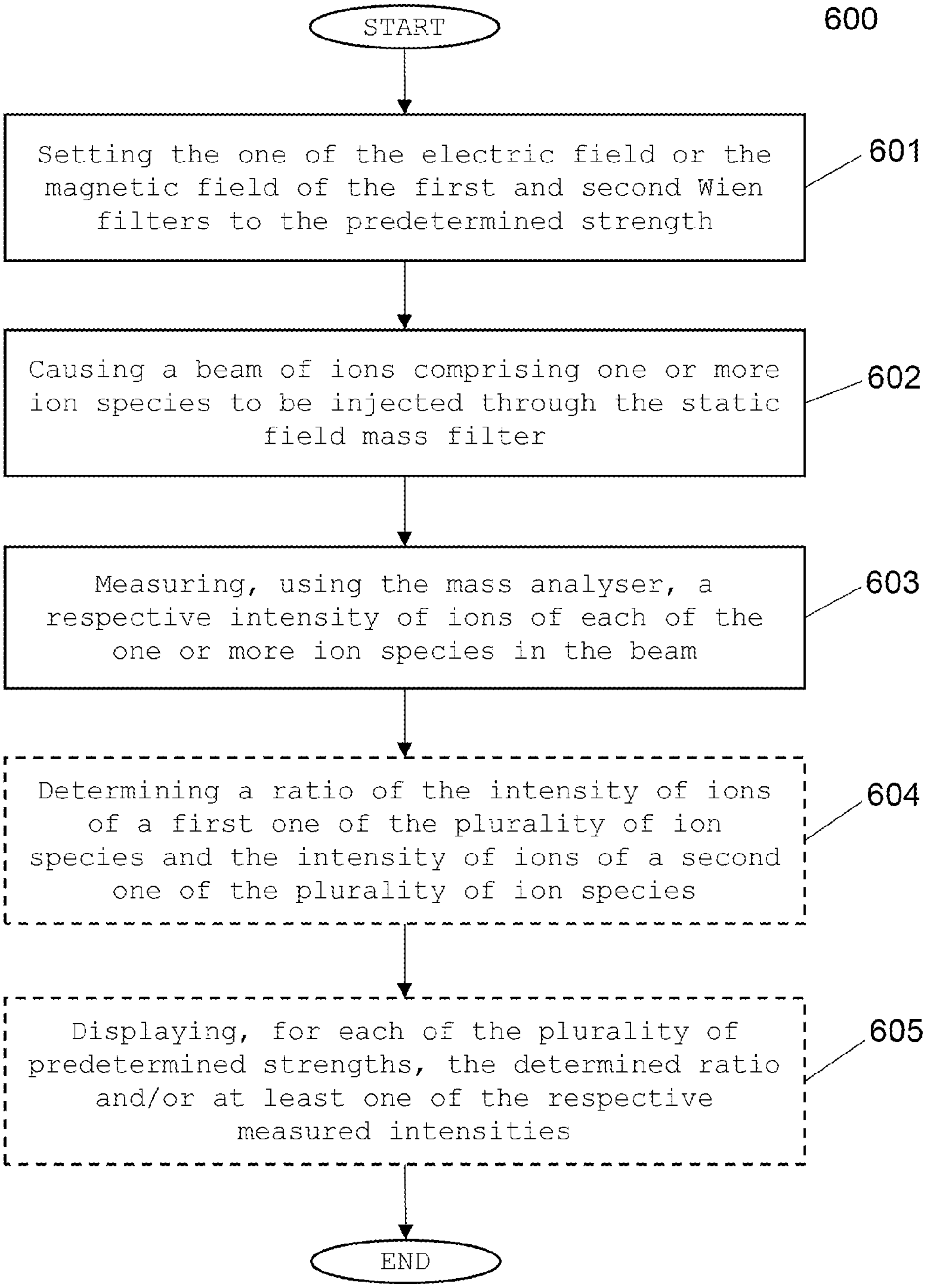
FIG. 6 is a flow diagram of an example method of analysing a field of a mass spectrometer, in accordance with various implementations.

A method 600 of analysing a field of mass spectrometer 200 comprises steps 601 to 605 shown in FIG. 6. The mass spectrometer 200 may comprise a mass analyser. The mass spectrometer 200 may further comprise static field mass filter 204 which may comprise the first Wien filter 212 and the second Wien filter 215.

The steps of method 600 may be repeated for each of a plurality of predetermined strengths of one of an electric field or a magnetic field of the first 212 and second 215 Wien filters.

The plurality of predetermined strengths may comprise: a minimum strength; a maximum strength; and, optionally, one or more strengths between the minimum and maximum strengths. The minimum strength, the maximum strength, and the one or more strengths between the minimum and maximum strengths may, for example, be equally spaced.

At step 601, the one of the electric field or the magnetic field of the first 212 and second 215 Wien filters may be set to the predetermined strength.

At step 602, a beam of ions comprising one or more ion species may be caused to be injected through the static field mass filter 204.

At step 603, using the mass analyser, a respective intensity of ions of each of the one or more ion species in the beam may be measured.

Method 600 may optionally comprise steps 604 and/or 605. At step 604, a ratio 807A of the intensity 800A of ions of a first one of the plurality of ion species and the intensity 800B of ions of a second one of the plurality of ion species may be determined. At step 605, for each of the plurality of predetermined strengths, at least one of the respective measured intensities 800A, 800B and/or the determined ratio 807A may be displayed (e.g., in the data display region 3002 and/or the data analysis region 3004).

Method 600 may optionally further comprise determining at least one strength range of the plurality of predetermined strengths in which the respective measured intensities of ions satisfy one or more predetermined mathematical and/or statistical criteria, and setting the one of the electric field or the magnetic field of the first and the second Wien filters to a strength within the at least one strength range. Strengths within the at least one strength range may be optimal or quasi-optimal. The one or more mathematical and/or statistical criteria may, for example, be based on the intensity and/or a determined ratio of intensities, as described below.

When multiple criteria are used (e.g., a first criterion based on the intensity and a second criterion based on the determined ratio of intensities), the one of the electric field or the magnetic field of the first and the second Wien filters may be set to a strength within at least one strength range which satisfies each of the multiple criteria.

Figure 7A:
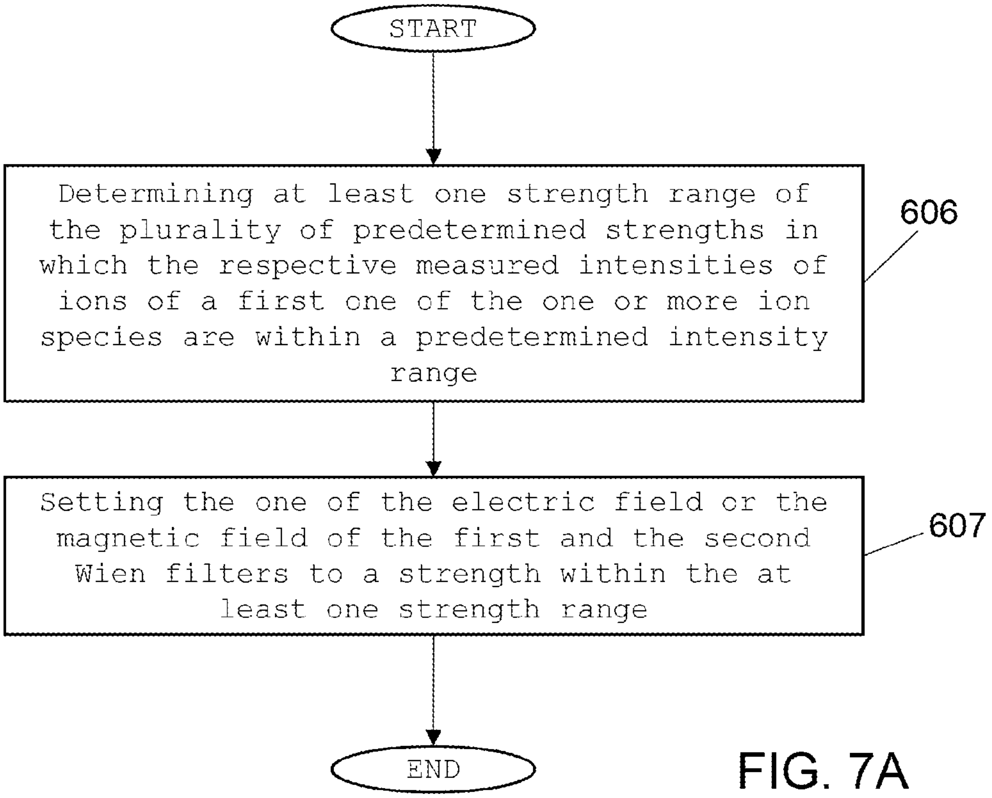
FIGS. 7A and 7B are flow diagrams showing example additional steps for the method of FIG. 6, in accordance with various implementations.
Figure 7B:
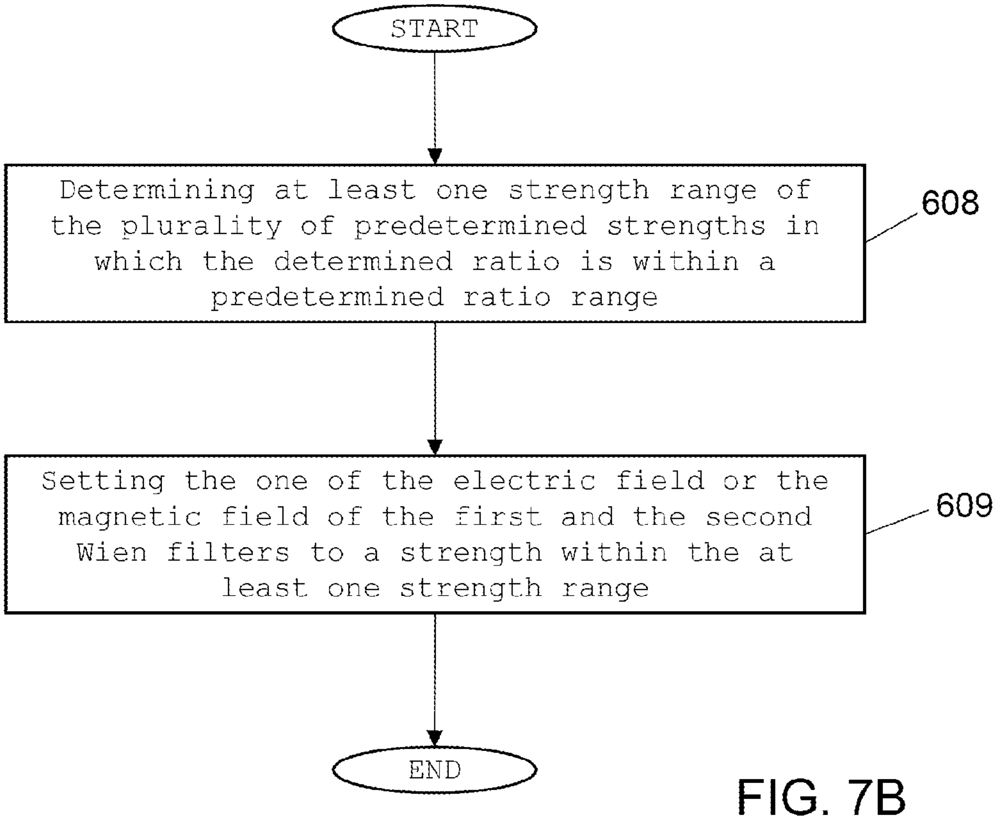

Method 600 may thus optionally further comprise steps 606 to 607 shown in FIG. 7A, and/or, when step 604 is performed, steps 608 to 609 shown in FIG. 7B.

At step 606, at least one strength range of the plurality of predetermined strengths in which the respective measured intensities of ions of a first one of the one or more ion species are within a given intensity range may be determined.

The given intensity range may, for example, be a range around/including a maximum of the respective measured intensities of ions of the first one of the one or more ion species (e.g., +/−a predetermined fraction of the maximum).

The maximum may be a global or local maximum, as explained below. The maximum may be selected by a user, e.g., on the graph displayed in step 605. Additionally or alternatively, the maximum may be determined (automatically) by a computer; for example, the maximum may be determined based on peak width and/or curve fitting (fitting to a model peak having a limited range of parameters).

At step 607, the one of the electric field or the magnetic field of the first 212 and the second 215 Wien filters may be set to a strength within the at least one strength range of step 606.

At step 608, at least one strength range of the plurality of predetermined strengths may be determined in which the determined ratio is or remains within a given ratio range.

The given ratio range may, for example, be a range in which the determined ratio is determined not to vary more than a predetermined amount (e.g., +/−a predetermined percentage); in other words, a 'stable' range.

Additionally, or alternatively, the strength range may be determined automatically by a computer; for example, the optimum may be determined based on peak width and/or curve fitting (fitting to a model peak having a limited range of parameters). The ratios may often be represented by an approximately S-shaped graph and the optimum strength range may be located at the inflection point, which can be determined automatically.

At step 609, the one of the electric field or the magnetic field of the first 212 and the second 215 Wien filters may be set to a strength within the at least one strength range of step 608.

After being performed based on a first ratio, step 608 may be repeated based on a second ratio of different ion species, and the one of the electric field or the magnetic field of the first 212 and the second 215 Wien filters may be set, in step 609, to a strength within the at least one strength range based on the first determined ratio and the at least one strength range based on the second determined ratio.

The determination of the at least one strength range of steps 606 and 608 is explained in more detail with reference to FIGS. 8A, 8B, 9A and 9B.

Figure 8A:
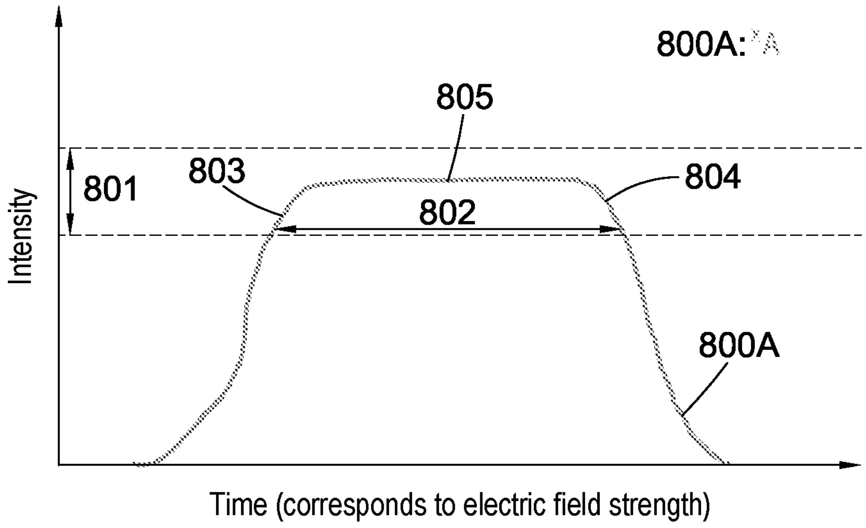
FIG. 8A is a simplified plot of a measurement of an intensity of ions of one or more ion species in a beam and shows at least one electric field strength range in which the measured intensities of ions are within a given intensity range.

Referring to FIG. 8A, the given intensity range 801 may indicate, for example, a "plateau" 802 of the intensity as a function of the one of the electric field or the magnetic field of the first and second Wien filters which is set to the predetermined strengths of the plurality of predetermined strengths. In a plateau the intensity remains within an intensity range 801; this may be achieved for at least one strength range of the plurality of predetermined strengths. The plateau may have a lower (or 'increasing') flank 803 and an upper (or 'decreasing' or 'declining') flank 804.

In the example of FIG. 8A, the graph shown is an intensity signal (${}^{x}$A: an element A with a mass x) chart 800A, an intensity versus time plot. The plot may, equivalently, be an intensity versus (electric or magnetic) field strength plot. The regular pattern of the scan makes it easier to detect asymmetries in the pre-filter window (e.g., caused by a strong ion beam in the vicinity of the beam of interest) and to identify the best measurement position (e.g., the maximum intensity 805). It is also possible to use other parameters in the scan, such as the magnetic field of the Wien filters.

Figure 8B:
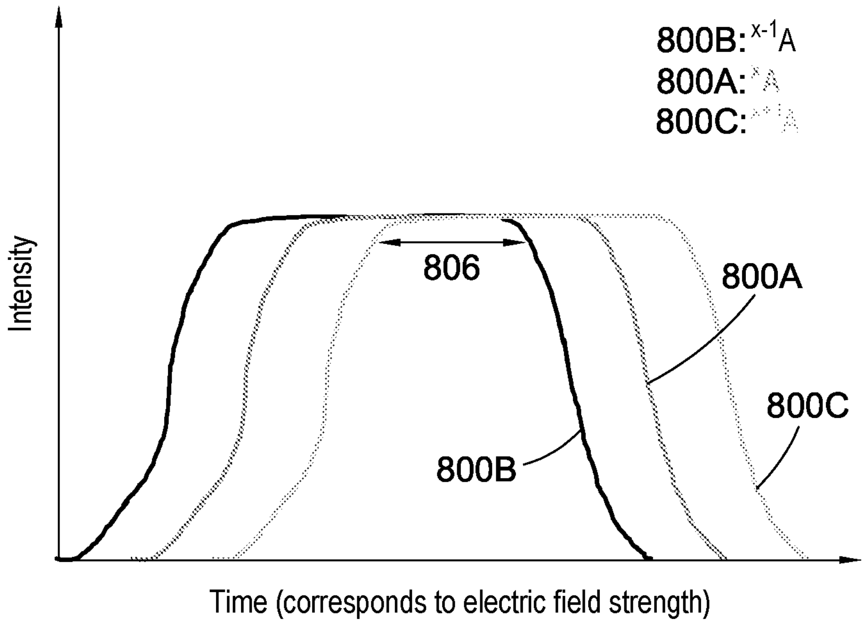
FIG. 8B is a simplified plot of the measurement of FIG. 8A carried out for multiple ion species.

As shown in FIG. 8B, the intensity scan may be carried out for different ion species of a plurality of ion species, yielding multiple intensity signal plots 800A, 800B, 800C (${}^{x}$A with mass x, ${}^{x-1}$A with mass x−1, and ${}^{x+1}$A with mass x+1, respectively). Thus, an (electric or magnetic) field strength suitable for all species may be determined (e.g., where all intensity traces show a common plateau 806). It will be understood that other mass differences may also be used, for example ${}^{x-2}$A and ${}^{x+2}$A, or ${}^{x-3}$A and ${}^{x+3}$A. Also, multiple elements or molecules A, B and C may be used, all exhibiting mass differences.

Figure 9A:
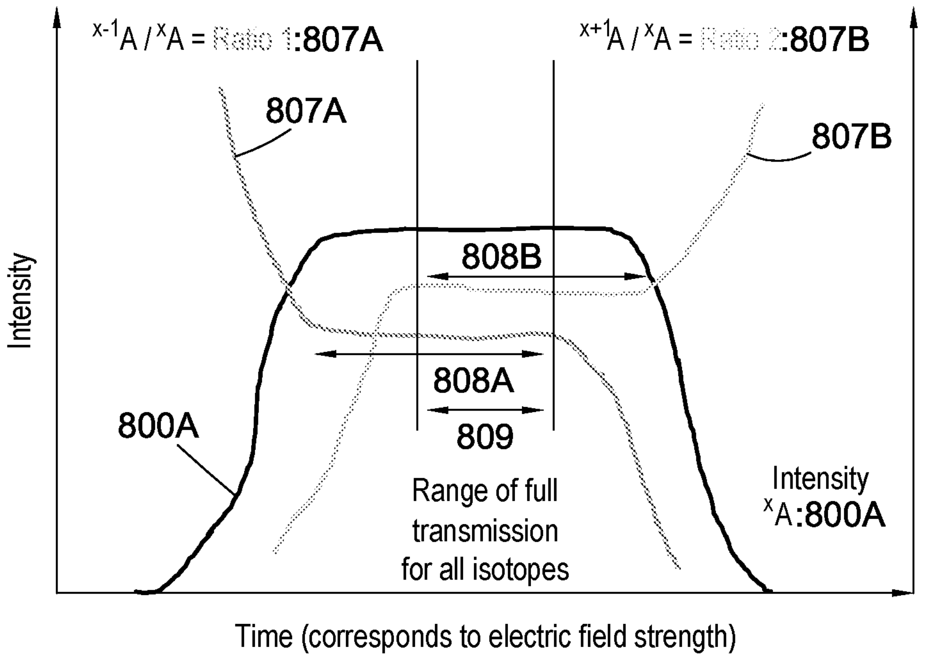
FIG. 9A is a simplified plot showing two examples of a ratio of the intensity of ions of a first one of a plurality of ion species and the intensity of ions of a second one of the plurality of ion species.

Referring to FIG. 9A, the intensity scan of FIG. 8B may be used to determine a ratio 807A of the intensity of ions of a first one of the plurality of ion species and the intensity of ions of a second one of the plurality of ion species. At least two intensities 800A, 800B are needed to determine one ratio, but more ratios 807B can be determined with additional intensities 800C.

In the example of FIG. 9A, to determine ratios 807A and 807B, the intensity 800B of the lightest ion species and the intensity 800C of the heaviest ion species are used as numerators while the intensity 800A of the medium-mass species is used as denominator. These are merely examples and the ratios may be defined in any other suitable way. Similarly to the intensities, the ratios may exhibit plateaus 808A and 808B. An electric field strength suitable for all species may thus be determined (e.g., where all intensity traces show a common plateau 809). Plateau 809, where the ratios give an (ideally) flat plateau, is an ideal value to which to set the strength of the one of the electric field or the magnetic field of the first 212 and second 215 Wien filters, where all isotopes are fully transmitted. It is noted that a plateau may not be horizontal in the graph but may be slanted.

Figure 9B:
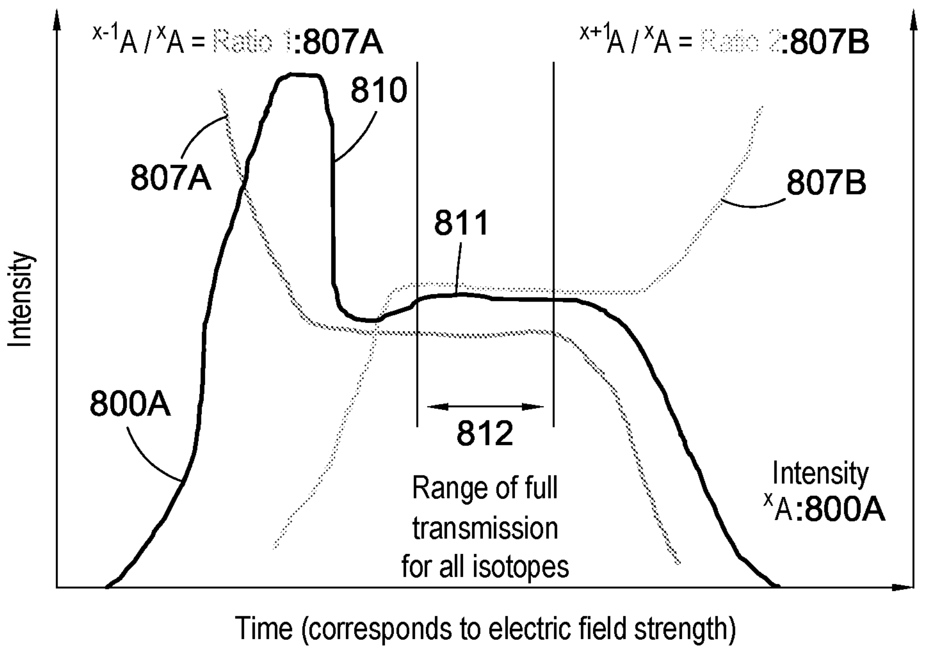
FIG. 9B is another example of a measurement of an intensity of ions of one of one or more ion species in a beam and shows at least one electric field strength range in which the measured intensities of ions are within a given intensity range. Additionally, a peak of the intensity that should be disregarded is shown.

Referring to FIG. 9B, the intensity may, as a function of the one of the electric field or the magnetic field of the first and second Wien filters which is set to the predetermined strengths of the plurality of predetermined strengths, exhibit multiple maxima (e.g., 810 and 811). The global maximum 810 may be used in other instruments to identify an optimal strength range of the plurality of predetermined strengths. However, this is not necessarily the best choice of strength range. Implementations may therefore disregard a global intensity maximum and determine, around another (local) maximum 811, at least one strength range of the plurality of predetermined strengths in which the given intensity range indicates, for example, a plateau of the intensity 812.

To avoid local maxima, a computer algorithm may identify the middle of the pre-filter window around maximum 811 by curve fitting or by identifying the rising and declining slope of intensity 800A.

Plateau 812 may also be identified for multiple species in a way analogous to that of FIG. 8B and/or using ratios in a way analogous to that of FIG. 9A.

In the example of FIG. 9B, the graph shown may be a 48Ti signal scanned across the plurality of predetermined electric field strengths. Titanium is an element with a mass similar to Ar, making it hard to completely cut an Ar beam. In this case, the best measurement position is achieved when the Ar beam is not transmitted, around maximum 811, while the user would intuitively tune the instrument to the maximum intensity 810. Additionally, if the isotope ratios of Ti are negatively affected by already partially overlapping with some of the lighter ion species, an electric field scan may help to identify such a problem. When Ar is cut, the Ti beam is highest at maximum 810. The optimum, however, where all Ti isotopes are transmitted for correct measurements, is maximum 811, along with some of the Ar. The pre-filter scan helps to find a compromise between best signal intensity and correct ratio determination.

In some implementations, the other of the electric field or the magnetic field of the first 212 and second 215 Wien filters may be set to a predetermined constant strength during the causing and the measuring for each of the plurality of predetermined strengths. For example, the electric field strength may be varied whilst the magnetic field strength is kept constant, or vice versa.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described implementation. Various additional operations may be performed, and/or described operations may be omitted in additional implementations. Operations are illustrated once each and in a particular order in FIG. 6 and FIGS. 7A and 7B, but the operations may be reordered and/or repeated as desired and appropriate (e.g., different operations performed may be performed in parallel, as suitable).

The approaches described herein may be embodied on a computer-readable medium. The computer-readable medium carries computer-readable instructions arranged for execution upon a processor so as to make the processor carry out any or all of the methods described herein. The computer-readable medium may be transitory (e.g., a wire or a wireless propagation medium in which a signal is being transmitted) or non-transitory.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an implementation", "various implementations", and "some implementations", each of which may refer to one or more of the same or different implementations. Furthermore, the terms "comprising", "including", "having", and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

Those skilled in the art will recognise that the scope of the invention is not limited by the examples described herein, but is instead defined by the appended claims.

The invention claimed is:

1. A method of analysing a field of a mass spectrometer comprising a mass analyser and a static field mass filter having a first Wien filter and a second Wien filter, the method comprising:

for each of a plurality of predetermined strengths of one of an electric field or a magnetic field of the first and second Wien filters:

setting the one of the electric field or the magnetic field of the first and second Wien filters to the predetermined strength;

causing a beam of ions comprising one or more ion species to be injected through the static field mass filter;

measuring, using the mass analyser, a respective intensity of ions of each of the one or more ion species in the beam;

determining at least one strength range of the plurality of predetermined strengths in which the respective measured intensities of ions satisfy one or more predetermined mathematical/statistical criteria; and setting the one of the electric field or the magnetic field of the first and the second Wien filters to a strength within the at least one strength range.

2. The method of claim 1, wherein the one or more ion species comprise a plurality of ion species, and wherein the method further comprises:

determining a ratio of the intensity of ions of a first one of the plurality of ion species and the intensity of ions of a second one of the plurality of ion species.

3. The method of claim 2, further comprising:

displaying, for each of the plurality of predetermined strengths, the determined ratio.

4. The method of claim 1, further comprising:

displaying, for each of the plurality of predetermined strengths, at least one of the respective measured intensities.

5. The method of claim 1, wherein the one or more predetermined mathematical/statistical criteria comprise the respective measured intensities of ions of a first one of the one or more ion species being within a given intensity range.

6. The method of claim 5, wherein at least one of:

the given intensity range includes a number of the respective measured intensities which match a predetermined pattern; or the given intensity range includes a maximum of the respective measured intensities of ions of the first one of the one or more ion species.

7. The method of claim 2, wherein the one or more predetermined mathematical/statistical criteria comprise the determined ratio being within a given ratio range.

8. The method of claim 7, wherein the given ratio range is a range within which the determined ratio is determined not to vary more than a predetermined amount.

9. The method of claim 1, wherein the method further comprises:

setting the other of the electric field or the magnetic field of the first and second Wien filters to a predetermined constant strength during the causing and measuring for each of the plurality of predetermined strengths.

10. The method of claim 1, wherein the plurality of predetermined strengths comprises:

a minimum strength; and a maximum strength.

11. The method of claim 10, wherein the plurality of predetermined strengths comprises one more strengths between the minimum strength and the maximum strength, wherein the minimum strength, the maximum strength and the one or more strengths between the minimum and maximum strengths are equally spaced.

12. The method of claim 1, wherein the method is computer-implemented.

13. An apparatus comprising a processor configured to perform a method of analysing a field of a mass spectrometer comprising a mass analyser and a static field mass filter having a first Wien filter and a second Wien filter, the method comprising:

for each of a plurality of predetermined strengths of one of an electric field or a magnetic field of the first and second Wien filters:

setting the one of the electric field or the magnetic field of the first and second Wien filters to the predetermined strength;

causing a beam of ions comprising one or more ion species to be injected through the static field mass filter;

measuring, using the mass analyser, a respective intensity of ions of each of the one or more ion species in the beam;

determining at least one strength range of the plurality of predetermined strengths in which the respective measured intensities of ions satisfy one or more predetermined mathematical/statistical criteria; and setting the one of the electric field or the magnetic field of the first and the second Wien filters to a strength within the at least one strength range.

14. The apparatus of claim 13, wherein the one or more ion species comprise a plurality of ion species, and wherein the method further comprises:

determining a ratio of the intensity of ions of a first one of the plurality of ion species and the intensity of ions of a second one of the plurality of ion species.

15. The apparatus of claim 14, wherein the method further comprises:

displaying, for each of the plurality of predetermined strengths, the determined ratio.

16. A non-transitory computer-readable medium comprising instructions which, when executed by a processor of an apparatus, cause the apparatus to perform a method of analysing a field of a mass spectrometer comprising a mass analyser and a static field mass filter having a first Wien filter and a second Wien filter, the method comprising:

for each of a plurality of predetermined strengths of one of an electric field or a magnetic field of the first and second Wien filters:

setting the one of the electric field or the magnetic field of the first and second Wien filters to the predetermined strength;

causing a beam of ions comprising one or more ion species to be injected through the static field mass filter;

measuring, using the mass analyser, a respective intensity of ions of each of the one or more ion species in the beam;

determining at least one strength range of the plurality of predetermined strengths in which the respective measured intensities of ions satisfy one or more predetermined mathematical/statistical criteria; and setting the one of the electric field or the magnetic field of the first and the second Wien filters to a strength within the at least one strength range.

17. The non-transitory computer-readable medium of claim 16, wherein the one or more ion species comprise a plurality of ion species, and wherein the method further comprises:

determining a ratio of the intensity of ions of a first one of the plurality of ion species and the intensity of ions of a second one of the plurality of ion species.

18. The non-transitory computer-readable medium of claim 16, wherein the method further comprises:

displaying, for each of the plurality of predetermined strengths, the determined ratio.

19. The non-transitory computer-readable medium of claim 16, wherein the one or more predetermined mathematical/statistical criteria comprise the respective measured intensities of ions of a first one of the one or more ion species being within a given intensity range.

20. The non-transitory computer-readable medium of claim 17, wherein the one or more predetermined mathematical/statistical criteria comprise the determined ratio being within a given ratio range.

21. The method of claim 10, wherein the plurality of predetermined strengths comprises one or more strengths between the minimum strength and maximum strength.

* * * * *